US012801514B2

(12) United States Patent
Konrad et al.

(10) Patent No.: US 12,801,514 B2
(45) Date of Patent: Nov. 17, 2026

(54) SYSTEM AND METHOD FOR TESTING A SOFTWARE APPLICATION AND RELATED DATA OF A VEHICLE

(71) Applicant: Bayerische Motoren Werke Aktiengesellschaft, Munich (DE)

(72) Inventors: Heiko Konrad, Baierbrunn (DE); Christopher von Kuensberg Sarre, Munich (DE); Marcel Arndt, Munich (DE); Steffen Haberland, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 196 days.

(21) Appl. No.: 18/565,842

(22) PCT Filed: Feb. 25, 2022

(86) PCT No.: PCT/EP2022/054846
§ 371 (c)(1),
(2) Date: Nov. 30, 2023

(87) PCT Pub. No.: WO2022/258233
PCT Pub. Date: Dec. 15, 2022

(65) Prior Publication Data

US 2024/0143490 A1 May 2, 2024

(30) Foreign Application Priority Data

Jun. 11, 2021 (DE) ..................... 10 2021 115 181.3

(51) Int. Cl.
*G06F 11/3668* (2025.01)

(52) U.S. Cl.
CPC ...... *G06F 11/3688* (2013.01); *G06F 11/3684* (2013.01); *G06F 11/3692* (2013.01)

(58) Field of Classification Search
CPC ...................................................... G06F 11/36
See application file for complete search history.

(56) References Cited

U.S. PATENT DOCUMENTS

2013/0226394 A1* 8/2013 Amirpour ............. G01M 17/06 701/31.4
2015/0193220 A1* 7/2015 Rork ...................... G06Q 10/20 717/170

(Continued)

FOREIGN PATENT DOCUMENTS

CN 112445197 A 3/2021
DE 10303489 A1 8/2004

(Continued)

OTHER PUBLICATIONS

International Search Report corresponding to International Patent Application No. PCT/EP2022/054846, dated Jun. 30, 2022 (4 pages).

(Continued)

*Primary Examiner* — Duy Khuong T Nguyen
(74) *Attorney, Agent, or Firm* — Maginot, Moore & Beck LLP

(57) ABSTRACT

A method for testing a software application and data related to the software application of a vehicle includes receiving a first vehicle configuration and a test parameter, the test parameter comprising a technical property of the first vehicle configuration. The method further includes specifying a setpoint value for the received test parameter, determining a first software identifier as a function of the first vehicle configuration, and specifying the software application and the data related to the software application by means of the first software identifier. The method also includes determining an actual value for the received test parameter using the specified software application or the specified data related to the software application, testing whether the determined actual value of the received test parameter and the determined setpoint value of the received (Continued)

100 test parameter match, and providing a test result of the received test parameter as a function of the test.

20 Claims, 4 Drawing Sheets

(56) References Cited

U.S. PATENT DOCUMENTS

| | | | | |
|---|---|---|---|---|
| 2016/0371076 | A1* | 12/2016 | Moeller | G06F 8/654 |
| 2018/0095745 | A1* | 4/2018 | Mine | G06F 11/3698 |
| 2018/0137033 | A1* | 5/2018 | Ohmert | G07C 5/008 |
| 2019/0367042 | A1* | 12/2019 | Cho | B60W 50/0205 |
| 2023/0252830 | A1* | 8/2023 | Merg | G07C 5/006<br>701/29.1 |

FOREIGN PATENT DOCUMENTS

| | | | |
|---|---|---|---|
| DE | 102015108359 | A1 | 12/2016 |
| DE | 102015014478 | A1 | 5/2017 |

OTHER PUBLICATIONS

Written Opinion corresponding to International Patent Application No. PCT/EP2022/054846, dated Jun. 30, 2022 (11 pages).

German Search Report corresponding to German Patent Application No. 10 2021 115 181.3, dated Nov. 30, 2021. (5 pages).

* cited by examiner

SYSTEM AND METHOD FOR TESTING A SOFTWARE APPLICATION AND RELATED DATA OF A VEHICLE

CROSS-REFERENCE TO RELATED APPLICATIONS

The present application is the U.S. national phase of PCT Application PCT/EP2022/054846 filed on Feb. 25, 2022, which claims priority of German patent application No. 102021115181.3 filed on Jun. 11, 2021, the entire contents of which are incorporated herein by reference.

FIELD

This disclosure relates to a system and method for testing a software application and data related to the software application of a vehicle. The disclosure further relates to a vehicle comprising the system for testing a software application and data related to the software application of a vehicle.

BACKGROUND

Assignment of software applications and software application-related data to vehicles can be complex due to a large range of vehicle variants. The high complexity of allocating software applications and software application-related data to a vehicle can lead to errors in the assignment of software applications and software application-related data. For example, if an incorrect software application and/or incorrect software application-related data is transmitted to a vehicle, errors in the operation of the vehicle and/or a failure of the vehicle may occur. From the prior art, methods are known for testing a logistical assignment of the software application and the software application-related data. However, content-related testing of the software application and/or software application-related data often does not take place, or not for all vehicle variants.

SUMMARY

It would be advantageous therefore to efficiently improve testing of software applications and data related to the software application of a vehicle. In particular, it would be advantageous to efficiently prevent incorrect assignment of software applications and software application-related data to a vehicle.

According to a first aspect, the disclosure herein is characterized by a method for testing a software application and data related to a software application of a vehicle. The method can be a computer-implemented method. The method comprises receiving a first vehicle configuration. The first vehicle configuration can be part of a vehicle configuration. A part of a vehicle configuration may be, for example, a drive configuration and/or a control unit configuration of a vehicle. Alternatively, the first vehicle configuration can be an entire configuration of a vehicle. The first vehicle configuration preferably includes all the data of a vehicle, with which a vehicle can be built. In addition or alternatively, the method can receive all or part of all vehicle configurations of a vehicle type or of multiple vehicle types and apply the method iteratively to each of these vehicle configurations. For example, a vehicle type can be a model range and/or a vehicle type of a vehicle manufacturer.

The method comprises receiving a test parameter, the test parameter comprising a technical property of the first vehicle configuration. The test parameter can be defined by a user and received by the method. The technical property of the first vehicle configuration may be a technical property of the whole vehicle, a technical property of a (sub)component of the vehicle, and/or a technical property of a component of the vehicle.

The method further comprises specifying a setpoint value for the received test parameter and determining a first software identifier as a function of the first vehicle configuration. The method can determine the first software identifier depending on a predefined knowledge of relationships using the first vehicle configuration. The predefined knowledge of relationships can define dependencies for a vehicle configuration, in particular for the first vehicle configuration. For example, the relationship knowledge can specify dependencies of technical properties, configuration options, (sub) components, and/or components of the vehicle. By evaluating the dependencies of the relationship knowledge, the first software identifier can be determined.

The method comprises specifying the software application and the data related to the software application by means of the first software identifier. To specify the software application and the software application-related data, one or more databases can be queried by means of the first software identifier in order to specify the software application and the software application-related data. Further, the method can comprise determining an actual value for the received test parameter using the specified software application and/or the determined data related to the software application. The method tests whether the determined actual value of the received test parameter and the determined setpoint value of the received test parameter match, and provides a test result of the received test parameter for the software application and the data related to the software application of the vehicle as a function of the test of whether the determined actual value of the received test parameter and the determined setpoint value of the received test parameter match. In addition or alternatively, the method can test whether the determined actual value of the received test parameter is within a value range of and/or in a set of discrete values, which is defined as a function of the determined setpoint value of the received test parameter. In addition or alternatively, the method can test by means of logical, Boolean, and/or algebraic rules and/or a predefined analysis function whether the determined actual value of the received test parameter and the determined setpoint value of the received test parameter are correct.

Advantageously, the method can carry out content-related testing of the software application and the software application-related data by determining a setpoint value for a first vehicle configuration and comparing this setpoint value with the actual value of the software application and/or the software application-related data. The content of the test value can be tested not only for the first vehicle configuration, but for all vehicle configurations. Errors in the configuration of the software application and/or the software application-related data of a vehicle can thus be efficiently avoided.

According to an advantageous embodiment of the disclosure herein, the data related to the software application comprises calibration data and/or coding data of the software application. Calibration data can specify a non-modifiable configuration of the software application. Coding data can include a modifiable configuration of the software application.

According to a further, advantageous embodiment, the first vehicle configuration can comprise a unique identifier of a vehicle type, technical properties of the vehicle, and components of the vehicle, and/or the unique identifier of the vehicle type, the technical properties of the vehicle and the components of the vehicle can uniquely specify a first variant of the vehicle. In addition or alternatively, the first vehicle configuration can comprise one or more identifiers of components of the vehicle. In addition, the first vehicle configuration may comprise one or more identifiers of functions and/or function bundles of the vehicle.

According to a further, advantageous embodiment, the setpoint value for the received test parameter can be specified in a rule-based manner by means of predefined rules for the received test parameter. In addition or alternatively, the setpoint value for the received test parameter can be specified by means of logical expressions, functions, and/or by means of a value range. This allows the setpoint value of the test parameter to be determined efficiently.

According to a further, advantageous embodiment, the first software identifier can uniquely identify the software application and the data related to the software application of one or more components of the first vehicle configuration.

According to a further, advantageous embodiment, the determination of the first software identifier as a function of the first vehicle configuration can comprise terminating the testing of the software application and the vehicle data related to the software application if no first software identifier is determined or multiple, first software identifiers are determined, and providing a test result, wherein the test result indicates an error in determining the first software identifier. This allows an error in an assignment of the software application to the first vehicle configuration to be efficiently detected. The method can be terminated without content-related testing because no unique software application and/or no unique software application-related data can be determined.

According to a further, advantageous embodiment, the determination of the first software identifier as a function of the first vehicle configuration, if exactly one first software identifier is determined, can comprise specifying the software application and the data related to the software application, determining an actual value for the received test parameter using the specified software application and/or the specified data related to the software application, testing whether the determined actual value of the received test parameter and the determined setpoint value of the received test parameter match, and providing the test result of the received test parameter for the software application and the data related to the software application of the vehicle as a function of the test of whether the determined actual value of the received test parameter and the determined setpoint value of the received test parameter match. This allows an efficient content-related testing of the actual value of the software application and/or the actual value of the software application-related data with the determined setpoint value. The plausibility of the actual value can be efficiently checked.

According to a further, advantageous embodiment, specifying the software application and the software application-related data by means of the first software identifier can comprise virtually deploying the software application and the data related to the software application as a function of the first vehicle configuration. The virtual deployment can comprise simulating or emulating the software applications, including the software application-related data. In other words, the virtual deployment can comprise simulating or emulating a configuration of the software application using the software application-related data for the first vehicle configuration. Here, the same methods are preferably used as those used when deploying the software application and the software application-related data during a programming operation of the software application in production of the vehicle on the basis of the first vehicle configuration.

According to a further, advantageous embodiment, the virtual deployment of the software application and the software application-related data as a function of the first vehicle configuration can comprise evaluating a Boolean logic, which is linked to the software application and/or the data related to the software application, for specifying the software application and/or the data related to the software application. According to a further advantageous embodiment, the determination of the actual value for the received test parameter using the specified software application and/or the specified data related to the software application can comprise executing at least one function of the specified software application for calculating the actual value for the received test parameter. This allows the content of the actual value to be verified with the setpoint value efficiently.

According to a further aspect, the disclosure herein is characterized by a machine-readable medium for testing a software application and data related to the software application, wherein the machine-readable medium comprises instructions that, when executed on a computer, carry out the method described above.

According to a further aspect, the disclosure is characterized by a system for testing a software application and data related to the software application of a vehicle, wherein the system is designed to carry out the method described above.

Additional features of the disclosure arise from the claims, the figures and the description of the figures. All the features and feature combinations cited in the description above, and the features and feature combinations cited in the description of the FIGS. below and/or shown in the figures alone are applicable not only in the respective combination indicated, but also in other combinations or else in isolation.

BRIEF DESCRIPTION OF THE DRAWINGS

In the following, an exemplary embodiment is described by reference to the attached drawings. This will reveal further details, preferred embodiments and extensions of the disclosure. Taken individually, in the figures, schematically in each case.

DISCLOSURE

Figure 1:
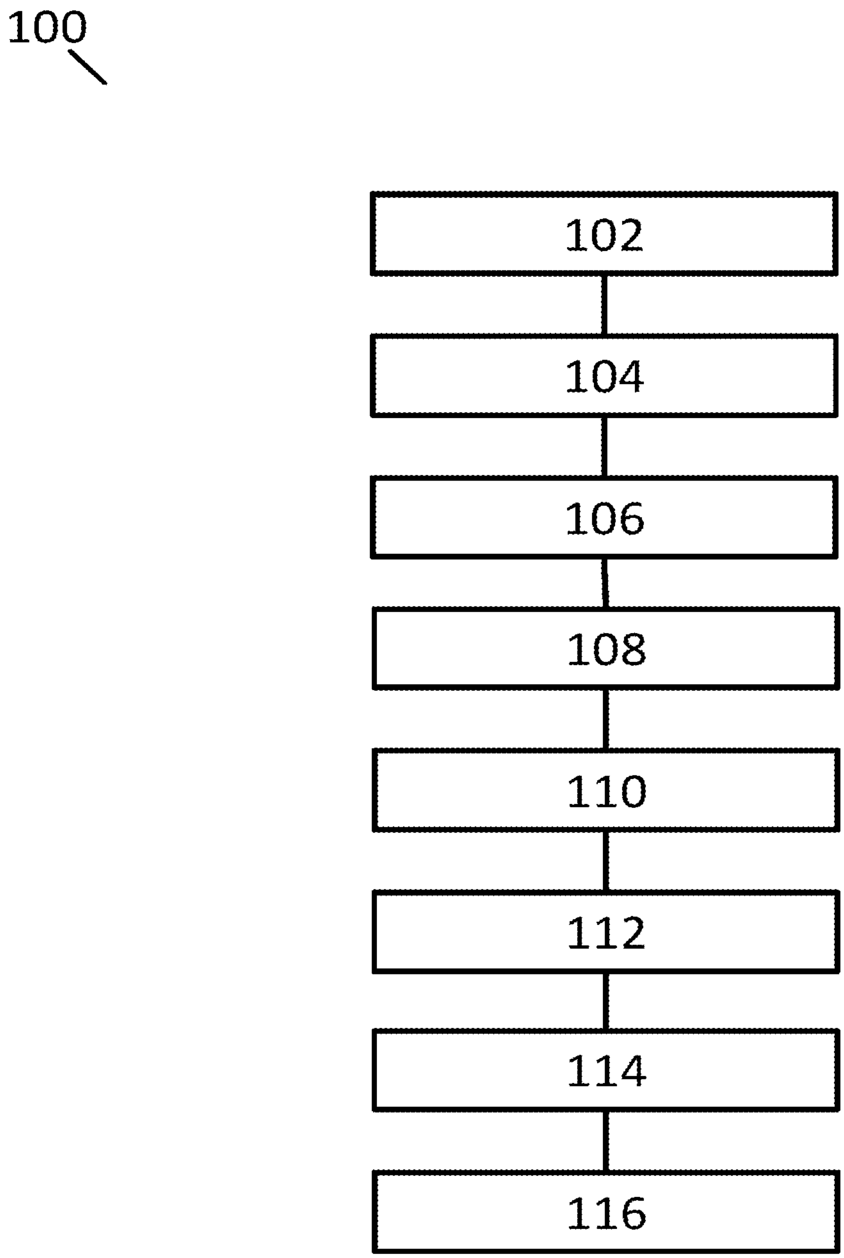
FIG. 1 shows an exemplary method for testing a software application and data related to the software application of a vehicle.

In detail, FIG. 1 shows an exemplary method 100 for testing a software application and data related to the software application of a vehicle. The software application can include metadata, the parameters of which can be tested. The software application-related data can comprise application data and/or coding data. Preferably, the method can detect errors in a configuration of a software application and/or data related to the software application of the vehicle. The method can ensure that the configuration of the software application and/or the software application-related data is correct.

Vehicles are often marketed in a wide variety of variants for different geographical regions. This can result in the software application and data related to the software application being created and tested for each variant and/or each geographic region. It is preferable to perform the verification each time the software application and data related to the software application are changed during the lifecycle of a vehicle.

The method 100 can receive a first vehicle configuration 102. The first vehicle configuration can be stored in a database and/or the first vehicle configuration can be dynamically generated and received by the method 100. As mentioned above, the method 100 can receive all possible vehicle configurations or part of all possible vehicle configurations and carry out the method for each vehicle configuration, for example, the first, second, third, . . . , n-th vehicle configuration.

Further, the method 100 can receive a test parameter 104, the test parameter comprising a technical property of the first vehicle configuration. Examples of the technical properties of the vehicle configuration can be: drive type, maximum speed, idle speed, power, sensor configuration, installation status of a vehicle component, configuration parameters of a vehicle component. Vehicle components can include sensors, engine control units, actuators, and/or any other mechanical or electromechanical components of the vehicle. Controllers are commonly used in vehicles or in association with vehicle testing. Controllers (which may also be referred to herein as “control units,” “processors” or “microprocessors”) include circuits (e.g., integrated circuits) that contain typical functionality of central processing units (CPU) and are configured to perform various calculations and analysis based on manufacturer programming. Examples of controllers used in vehicles include any of various Engine Control Units (ECNs) and commonly used by different manufacturers in modern automobiles. Examples of controllers used in association with vehicles include those used in vehicle test units that communicate with the ECN and may include sensors such as power meters. The test parameter received can correspond to a setpoint value of the vehicle from which a setpoint value of the software application and/or the data related to the software application is specified.

Furthermore, the method 100 can specify a setpoint value for the received test parameter 106. The specified setpoint value preferably corresponds to a setpoint value of the software application and/or the data related to the software application. For specifying 106 the setpoint value for the received test parameter, the method can evaluate predefined rules, in particular predefined test rules, for the received test parameter. For each test parameter, one or more test rules can be evaluated to specify the setpoint value of the software application and/or the data related to the software application.

The method 100 can determine a first software identifier as a function of the first vehicle configuration 108. The first software identifier is preferably unique. The first software identifier can be determined by evaluating relationship knowledge as a function of the first vehicle configuration. The relationship knowledge may include associations and/or rules between properties and/or parameters of the first vehicle configuration and/or components of the first vehicle configuration, which are evaluated for determining the first software identifier. By means of the first software identifier, the method 100 can specify 110 the software application and the software application-related data.

The method can determine 112 an actual value for the received test parameter using the specified software application and/or the specified data related to the software application. Furthermore, the method 100 can test 114 whether the determined actual value of the received test parameter and the specified setpoint value of the received test parameter match. Finally, the method 100 can provide a test result of the received test parameter for the software application and the data related to the software application of the vehicle as a function of the test 114 of whether the determined actual value of the received test parameter and the determined setpoint value of the received test parameter match.

Figure 2:
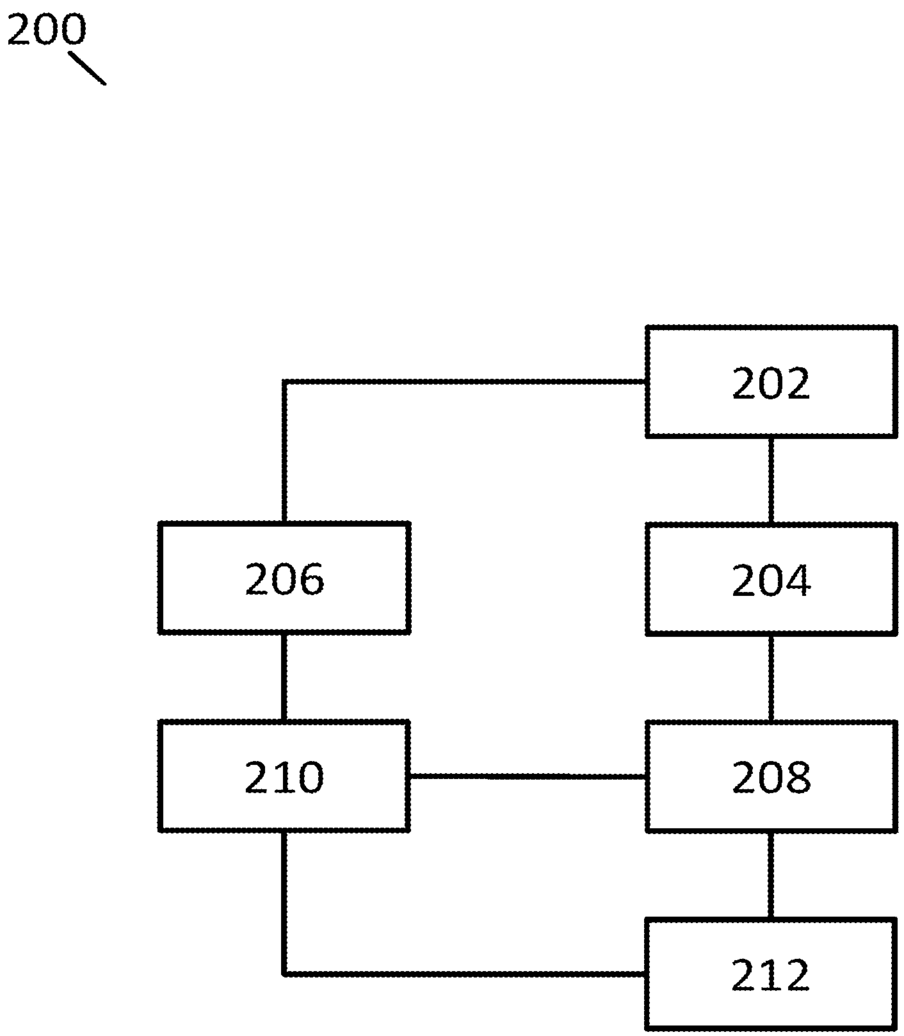
FIG. 2 shows an exemplary application scenario of the method for testing a drive type.

In detail, FIG. 2 shows an exemplary application scenario 200 of the method 100 for testing a drive type. In the application scenario, the method 100 can receive a drive type “AWD” 202 as a test value. AWD here is the abbreviation for all-wheel drive. For the drive type “AWD”, the method 100 can determine a unique software identifier 204 as a first software identifier. Furthermore, the method 100 can specify a setpoint value “Drive Setpoint=AWD” 206 for the test value AWD for the software application and the software application-related data. Furthermore, the method can determine the actual value “Drive Actual=AWD” 208 for the test value “AWD” 202 and test 210 whether “Drive Setpoint=AWD” and “Drive Actual=AWD” match. The method 100 can provide the result of the test “AWD Test OK” 212 to a user.

Figure 3:
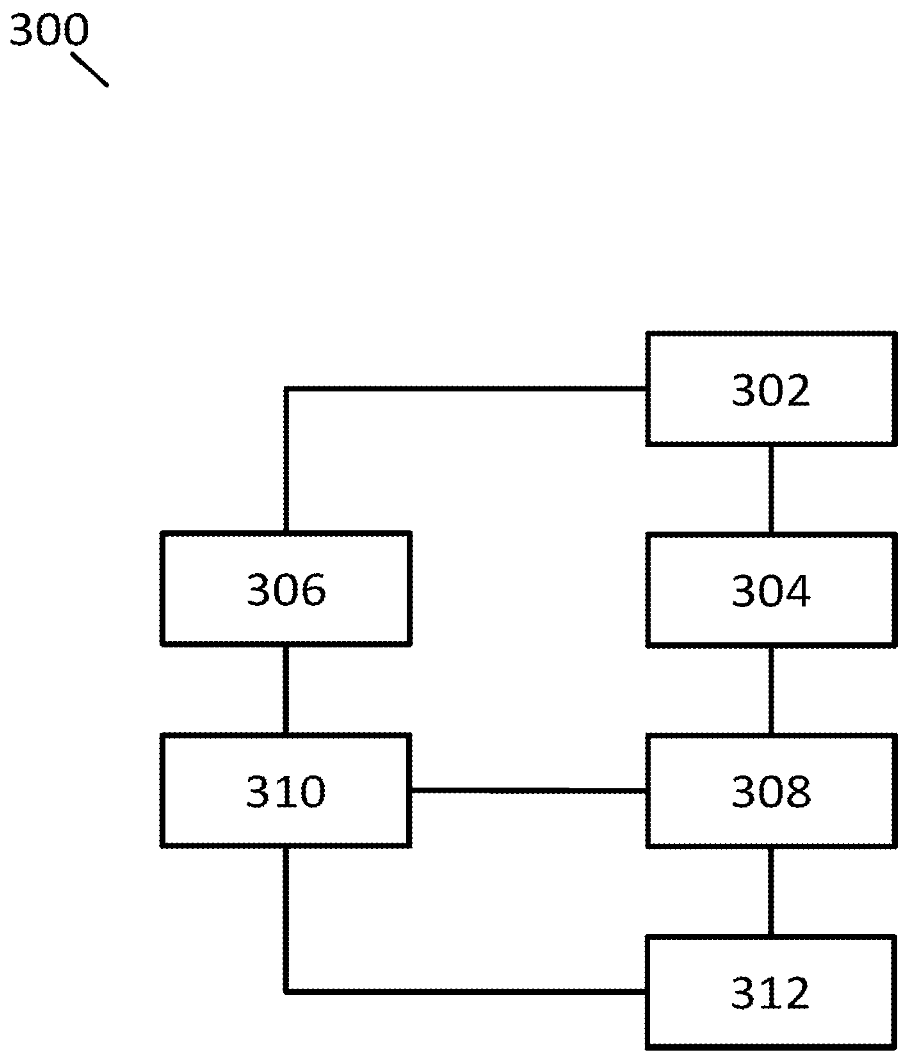
FIG. 3 shows an exemplary application scenario of the method for testing an engine power configuration.

In detail, FIG. 3 shows an exemplary application scenario 300 of the method 100 for testing an engine power configuration. In the application scenario 300, the method can test data related to the software application, in particular application data and/or coding data, for their correctness with respect to a given vehicle configuration, e.g. the first vehicle configuration of the method 100. First, the method receives “Power 200 kW” 302 as a test value. For the given vehicle configuration, a unique software identifier 304 can be determined by the method 100. Furthermore, the method 100 can specify a setpoint value “Power Setpoint=200 kW” 306 for the test value “Power 200 kW” for the data related to the software application. By means of the unique software identifier 304, the method 100 can determine an actual value of the power “Power Actual=210 kW” 308. To determine the actual value of the power, the method 100 can perform a functional simulation using a torque characteristic and coding parameters of the vehicle. For example, for the function simulation the method can execute the software application of the vehicle and specify a maximum power of the vehicle, the actual value of the power, by means of the torque characteristic and the engine speed of the vehicle. The method 100 can test 310 whether the actual value of the power and the setpoint value of the power match. In the application scenario 300, the actual value of the power is greater than the setpoint value of the power. This may be due, for example, to an incorrect torque characteristic that is stored in the data related to the software application. The method 100 can finally output the test result “Power Check Not OK” 312.

Figure 4:
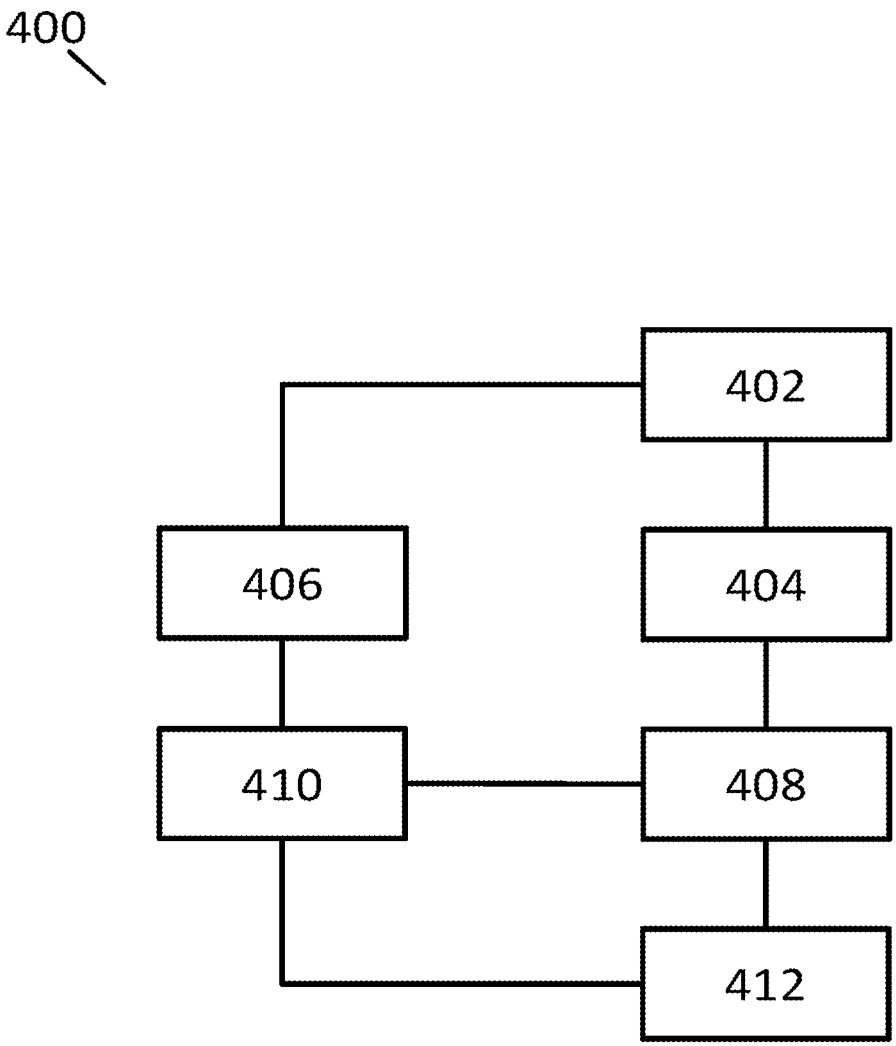
FIG. 4 shows an exemplary application scenario of the method for testing a sensor configuration.

In detail, FIG. 4 shows an exemplary application scenario 400 of the method 100 for testing a sensor configuration. In the application scenario 300, the method can test a sensor configuration of a sensor of a vehicle configuration with respect to the correctness of the sensor configuration. The method can receive a unique identifier of the sensor 402 as a test value. The method 100 can evaluate a predefined relationship knowledge of a vehicle configuration comprising the sensor, in order to determine a unique software application identifier 404. Furthermore, the method 100 can specify a setpoint value "Diagnostic_label_setpoint=12" 406 of the software application and the data related to the software application for the unique identifier of the sensor. By means of the unique software identifier 404, the method 100 can determine an actual value "Diagnostic_label_actual=2" 408 from the software application and/or the software application-related data. The method 100 can test 410 whether the actual value and the setpoint value match. In the application scenario 400, the actual value does not match the setpoint value. The vehicle configuration sensor is incorrectly configured in the software application and/or the software application-related data. The method 100 can finally output the test result "Sensor test not OK" 412.

Advantageously, an automated, content-related test of the correctness of a software application and data related to the software application for a plurality of vehicle configurations can be carried out efficiently by the method. The automated, content-related test can efficiently prevent the deployment of a faulty software application and/or a faulty configuration of a software application with data related to the software application on a vehicle during the production of the vehicle or during an update of the vehicle software of the vehicle.

LIST OF REFERENCE SIGNS

100 method
102 receiving a first vehicle configuration
104 receiving a test parameter
106 specifying a setpoint value
108 determining a first software identifier
110 specifying a software application
112 determining an actual value
114 testing
116 providing a test result
200 application scenario for drive type
202 test value for drive type AWD
204 unique software identifier
206 setpoint value
208 actual value
210 testing whether the setpoint value is equal to the actual value
212 test result
300 application scenario for engine power configuration
302 test value power
304 unique software identifier
306 setpoint value
308 actual value
310 testing
312 test result
400 application scenario for sensor configuration
402 test value
404 unique software identifier
406 setpoint value
408 actual value
410 testing
412 test result

What is claimed is:

1. A method for testing a software application and data related to the software application of a vehicle, the method comprising:

receiving a first vehicle configuration;

receiving a test parameter, the test parameter comprising a technical property of the first vehicle configuration;

specifying a setpoint value for the received test parameter;

determining a first software identifier as a function of the first vehicle configuration, wherein the first software identifier is a unique identifier that identifies the software application as a software application configured to determine an actual value for the received test parameter;

specifying the software application and the data related to the software application by means of the first software identifier;

determining an actual value for the received test parameter using the specified software application or the specified data related to the software application;

testing whether the determined actual value of the received test parameter and the determined setpoint value of the received test parameter match; and providing a test result of the received test parameter for the software application and the data related to the software application of the vehicle as a function of the test of whether the determined actual value of the received test parameter and the determined setpoint value of the received test parameter match.

2. The method as claimed in claim 1, wherein the data related to the software application comprises calibration data or coding data of the software application.

3. The method as claimed in claim 1, wherein the first vehicle configuration comprises a unique identifier of a vehicle type and technical properties of the vehicle;

wherein the unique identifier of the vehicle type and the technical properties of the vehicle uniquely specify a first variant of the vehicle associated with a first geographic region.

4. The method as claimed in claim 3, wherein the first software identifier uniquely identifies the software application and the data related to the software application of one or more components of the first vehicle configuration.

5. The method as claimed in claim 1, wherein the setpoint value for the received test parameter is determined in a rule-based manner by means of predefined rules for the received test parameter.

6. The method as claimed in claim 1, wherein determining the first software identifier as a function of the first vehicle configuration comprises:

if no first software identifier is determined or multiple first software identifiers are determined:

terminating the testing of the software application and the data related to the software application of the vehicle; and providing a test result, wherein the test result indicates an error in determining the first software identifier.

7. The method as claimed in claim 1, wherein determining the first software identifier as a function of the first vehicle configuration comprises:

if exactly one first software identifier is determined:

specifying the software application and the data related to the software application by means of the first software identifier;

determining an actual value for the received test parameter using the specified software application and the specified data related to the software application;

testing whether the determined actual value of the received test parameter and the determined setpoint value of the received test parameter match; and providing the test result of the received test parameter for the software application and the data related to the software application of the vehicle as a function of the test of whether the determined actual value of the received test parameter and the determined setpoint value of the received test parameter match.

8. The method as claimed in claim 1, wherein specifying the software application and the data related to the software application by means of the first software identifier comprises:

virtually deploying the software application and the data related to the software application as a function of the first vehicle configuration.

9. The method as claimed in claim 8, wherein virtually deploying the software application and the data related to the software application as a function of the first vehicle configuration comprises:

evaluating a Boolean logic associated with the software application or the data related to the software application to specify the software application or the data related to the software application.

10. The method as claimed in claim 1, wherein determining the actual value for the received test parameter using the specified software application or the specified data related to the software application comprises:

executing at least one function of the specified software application to calculate the actual value for the received test parameter.

11. A non-transient computer-readable medium for testing a software application and data related to the software application of a vehicle, wherein the computer-readable medium comprises instructions that, when executed on a computer, are configured to:

receive a first vehicle configuration;

receive a test parameter, the test parameter comprising a technical property of the first vehicle configuration;

specify a setpoint value for the received test parameter;

determine a first software identifier as a function of the first vehicle configuration, wherein the first software identifier is a unique identifier that identifies the software application and the software application is configured to determine an actual value for the received test parameter;

specify the software application and the data related to the software application by means of the first software identifier;

determine an actual value for the received test parameter using the specified software application or the specified data related to the software application;

test whether the determined actual value of the received test parameter and the determined setpoint value of the received test parameter match; and provide a test result of the received test parameter for the software application and the data related to the software application of the vehicle as a function of the test of whether the determined actual value of the received test parameter and the determined setpoint value of the received test parameter match.

12. The computer-readable medium as claimed in claim 11, wherein the data related to the software application comprises calibration data or coding data of the software application.

13. The computer-readable medium as claimed in claim 11, wherein the first vehicle configuration comprises a unique identifier of a vehicle type and technical properties of the vehicle;

wherein the unique identifier of the vehicle type and the technical properties of the vehicle uniquely specify a first variant of the vehicle associated with a first geographic region.

14. The computer-readable medium as claimed in claim 13, wherein the first software identifier uniquely identifies the software application and the data related to the software application of one or more components of the first vehicle configuration.

15. The computer-readable medium as claimed in claim 11, wherein the setpoint value for the received test parameter is determined in a rule-based manner by means of predefined rules for the received test parameter.

16. The computer-readable medium as claimed in claim 11, wherein the computer-readable medium are configured to determine the first software identifier as a function of the first vehicle configuration by:

when no first software identifier is determined or multiple first software identifiers are determined:

terminating the testing of the software application and the data related to the software application of the vehicle; and providing a test result, wherein the test result indicates an error in determining the first software identifier.

17. The computer-readable medium as claimed in claim 11, wherein the computer-readable medium are configured to determine the first software identifier as a function of the first vehicle configuration by:

when exactly one first software identifier is determined:

specifying the software application and the data related to the software application by means of the first software identifier;

determining an actual value for the received test parameter using the specified software application or the specified data related to the software application;

testing whether the determined actual value of the received test parameter and the determined setpoint value of the received test parameter match; and providing the test result of the received test parameter for the software application and the data related to the software application of the vehicle as a function of the test of whether the determined actual value of the received test parameter and the determined setpoint value of the received test parameter match.

18. The computer-readable medium as claimed in claim 11, wherein the computer-readable medium are configured to specify the software application and the data related to the software application by means of the first software identifier by:

virtually deploying the software application and the data related to the software application as a function of the first vehicle configuration, wherein said virtually deploying the software application comprises evaluating a Boolean logic associated with the software application or the data related to the software application to specify the software application or the data related to the software application.

19. The computer-readable medium as claimed in claim 11, wherein the computer-readable medium are configured to determine the actual value for the received test parameter using the specified software application or the specified data related to the software application by:

executing at least one function of the specified software application to calculate the actual value for the received test parameter.

20. A system for testing a software application and data related to the software application of a vehicle, the system comprising:

a database including a first vehicle configuration and a test parameter comprising a technical property of the first vehicle configuration;

a controller in communication with the database, the controller, using a processor, configured to:

receive the first vehicle configuration and the test parameter;

specify a setpoint value for the received test parameter;

determine a first software identifier as a function of the first vehicle configuration, wherein the first software identifier is a unique identifier that identifies the software application as a software application configured to determine an actual value for the received test parameter;

specify a software application and data related to the software application by means of the first software identifier; and an engine control unit or vehicle sensor in communication with the controller and configured to provide an actual value for the received test parameter using the specified software application or the specified data related to the software application;

wherein the controller is further configured to determine whether the actual value of the received test parameter and the determined setpoint value of the received test parameter match, and provide a test result of the received test parameter for the software application and the data related to the software application of the vehicle as a function of the determination whether the actual value of the received test parameter and the setpoint value of the received test parameter match.

* * * * *